(12) United States Patent
Tsai et al.

(10) Patent No.: US 11,201,404 B2
(45) Date of Patent: Dec. 14, 2021

(54) ELECTROMAGNETIC WAVE ADJUSTING DEVICE

(71) Applicant: Innolux Corporation, Miao-Li County (TW)

(72) Inventors: Hsiuyi Tsai, Miao-Li County (TW); Yi Hung Lin, Miao-Li County (TW); Chia-Chi Ho, Miao-Li County (TW); Yan-Zheng Wu, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 17/035,725

(22) Filed: Sep. 29, 2020

(65) Prior Publication Data

US 2021/0119333 A1 Apr. 22, 2021

Related U.S. Application Data

(60) Provisional application No. 62/916,881, filed on Oct. 18, 2019.

(30) Foreign Application Priority Data

Jul. 24, 2020 (CN) .......................... 202010721931.6

(51) Int. Cl.
*H01Q 3/44* (2006.01)
*G02F 1/13* (2006.01)
(Continued)

(52) U.S. Cl.
CPC ............ *H01Q 3/44* (2013.01); *G02F 1/1313* (2013.01); *H01Q 1/364* (2013.01);
(Continued)

(58) Field of Classification Search
CPC .. H01Q 3/44; H01Q 15/0086; H01Q 15/0066; H01Q 1/364; H01Q 21/065; H01Q 21/24; G02F 1/1313
See application file for complete search history.

(56) References Cited

U.S. PATENT DOCUMENTS

2018/0358690 A1* 12/2018 Linn .................... H01Q 3/2676

FOREIGN PATENT DOCUMENTS

CN 109119762 1/2019

* cited by examiner

*Primary Examiner* — Joseph J Lauture
(74) *Attorney, Agent, or Firm* — JCIPRNET

(57) ABSTRACT

An electromagnetic wave adjusting device includes a first substrate, a first conductive element, a first insulation layer, a second substrate, a second conductive element, a dielectric layer, and a conductive layer. The first conductive element is disposed on the first substrate. The first insulation layer is disposed on the first conductive element. The second conductive element is disposed on the second substrate. The dielectric layer is disposed between the first substrate and the second substrate. The first conductive layer is disposed on the first insulation layer and electrically connected to the first conductive element. The electromagnetic wave adjusting device includes an overlap area and a capacitance adjustable area. An overlap portion of the first conductive element and the second conductive element constitutes the overlap area, the capacitance adjustable area includes the overlap area, and at least part of the first conductive layer is disposed in the capacitance adjustable area.

10 Claims, 5 Drawing Sheets

(51) Int. Cl.
*H01Q 15/00* (2006.01)
*H01Q 1/36* (2006.01)
*H01Q 21/06* (2006.01)
*H01Q 21/24* (2006.01)

(52) U.S. Cl.
CPC ..... *H01Q 15/0066* (2013.01); *H01Q 15/0086* (2013.01); *H01Q 21/065* (2013.01); *H01Q 21/24* (2013.01)

ELECTROMAGNETIC WAVE ADJUSTING DEVICE

CROSS-REFERENCE TO RELATED APPLICATION

This application claims the priority benefit of U.S. provisional application Ser. No. 62/916,881, filed on Oct. 18, 2019, and China application serial no. 202010721931.6, filed on Jul. 24, 2020. The entirety of each of the above-mentioned patent applications is hereby incorporated by reference herein and made a part of this specification.

BACKGROUND

Technical Field

The disclosure relates to an electromagnetic wave adjusting device, and more particularly to an antenna device.

Description of Related Art

An electromagnetic wave adjusting device (e.g., an antenna device, etc.) is an indispensable part of wireless communication technology. Taking a wireless communication device using a liquid crystal antenna as an example, liquid crystal materials are filled between two conductive elements. An insulation layer is disposed in the capacitance adjustable area between the two conductive elements. The insulation layer may affect the capacitance adjustment range of the capacitance adjustable area.

SUMMARY

According to an embodiment of the disclosure, an electromagnetic wave adjusting device includes a first substrate, a first conductive element, a first insulation layer, a second substrate, a second conductive element, a dielectric layer, and a first conductive layer. The first conductive element is disposed on the first substrate. The first insulation layer is disposed on the first conductive element. The second substrate is disposed opposite to the first substrate. The second conductive element is disposed on the second substrate and faces the first substrate. The dielectric layer is disposed between the first substrate and the second substrate. The first conductive layer is disposed on the first insulation layer and electrically connected to the first conductive element. The electromagnetic wave adjusting device includes an overlap area and a capacitance adjustable area. An overlap portion of the first conductive element and the second conductive element constitutes the overlap area. The capacitance adjustable area includes the overlap area, and at least part of the first conductive layer is disposed in the capacitance adjustable area.

In order to make the aforementioned features and advantages of the disclosure comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
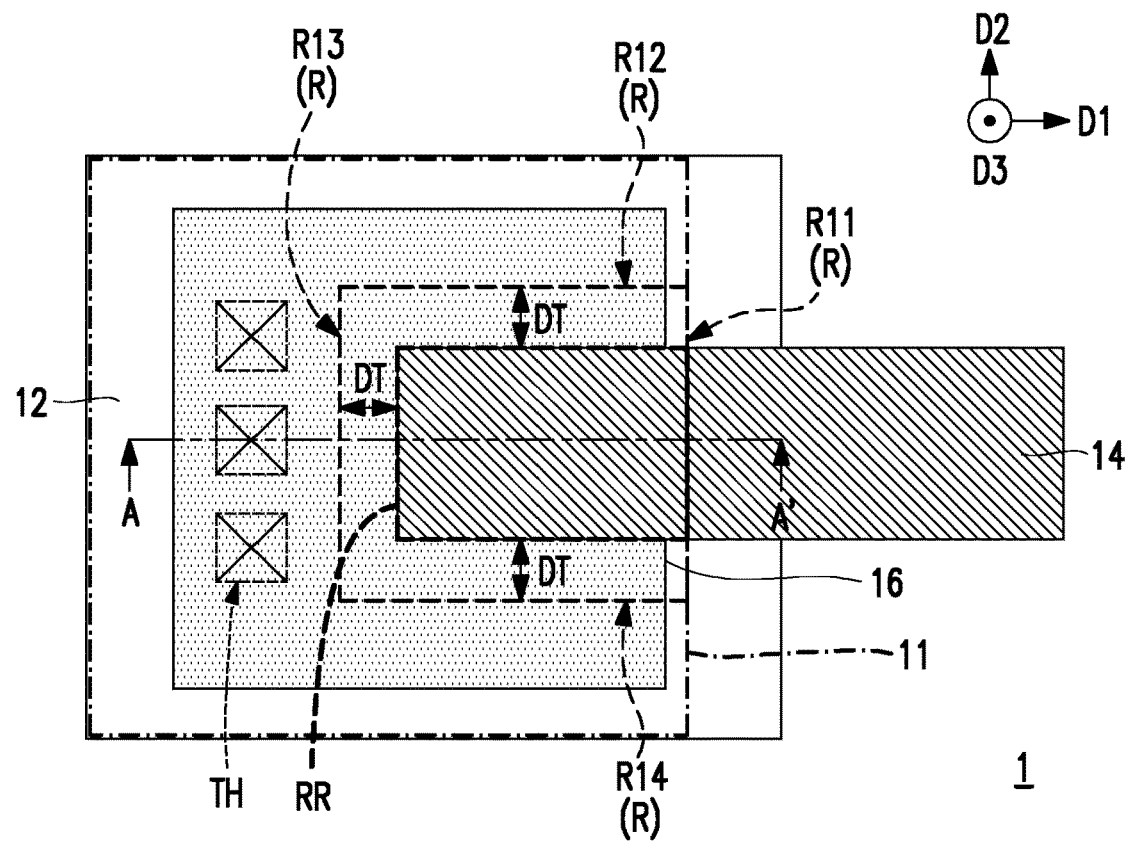
FIG. 1A is a schematic top view showing a part of an electromagnetic wave adjusting device according to the first embodiment of the disclosure.

The disclosure may be understood by referring to the following detailed description with reference to the accompanying drawings. It is noted that for comprehension of the reader and simplicity of the drawings, in the drawings of the disclosure, only a part of the electronic device/display device is shown, and specific components in the drawings are not necessarily drawn to scale. Moreover, the quantity and the size of each component in the drawings are only schematic and are not intended to limit the scope of the disclosure. For example, the relative size, thickness and location of layers, regions, and/or structures may be reduced or enlarged for clarity.

Throughout the specification and the appended claims of the disclosure, certain terms are used to refer to specific components. Those skilled in the art should understand that electronic device manufacturers may probably use different names to refer to the same components. This specification is not intended to distinguish between components that have the same function but different names. In the following specification and claims, the terms "including", "containing", "having", etc., are open-ended terms, so they should be interpreted to mean "including but not limited to . . . ".

In the following embodiments, wordings used to indicate directions, such as "up," "down," "front," "back," "left," and "right," merely refer to directions in the accompanying drawings. Therefore, the directional wordings are used to illustrate rather than limit the disclosure. It should be understood that when a component or a film layer is described as being "connected to" another component or film layer, it may be directly on or connected to the another component or film layer, or there is an intervening component or film layer therebetween (not directly connected). On the contrary, when a component or film layer is described as being "directly connected" to another component or film layer, there is no intervening component or film layer therebetween. It should be understood that when a component or a film layer is described as being "disposed on" another component or film layer, it may be directly on the another component or film layer, or there is an intervening component or film layer therebetween (not directly on). On the contrary, when a component or film layer is described as being "directly disposed on" another component or film layer, there is no intervening component or film layer therebetween.

The terms such as "about", "equal", "same", "substantially", or "approximately" are generally interpreted as being within a range of plus or minus 10% of a given value or range, or as being within a range of plus or minus 5%, plus or minus 3%, plus or minus 2%, plus or minus 1%, or plus or minus 0.5% of the given value or range. In addition, a term "a given range is between the first value and the second value" and a term "a given value is within a range between the first value and the second value", unless specifically defined, both mean the given range includes the first value, the second value, and the values therebetween.

In some embodiments of the disclosure, terms such as "connect" and "interconnect" with respect to bonding and connection, unless specifically defined, may refer to two structures that are in direct contact with each other, or may refer to two structures that are indirectly in contact with each other, wherein there are other structures set between these two structures. In addition, the terms that describe joining and connecting may apply to the case where both structures are movable or both structures are fixed. In addition, the terms "electrically connected" and "coupling" involve any direct and indirect electrical connection means.

In the embodiments, the same or similar elements will be designated by the same or similar reference numerals, and descriptions thereof will be omitted. In addition, the features of multiple embodiments may be used in combination as long as such combination does not depart from the spirit of the disclosure or leads to conflict, and equivalent changes and modifications made according to the specification or claims are still within the scope of this disclosure. In addition, the terms such as "first" and "second" mentioned in the specification or the claims are only used to name discrete elements or to distinguish different embodiments or scopes and are not intended to limit the upper or lower limit of the number of the elements, nor are they intended to limit the manufacturing order or disposition order of the elements.

The electronic device of the disclosure may include an electromagnetic wave adjusting device (e.g., an antenna device) or an electronic device with an electromagnetic wave adjusting element (e.g., an antenna), but the disclosure is not limited thereto. The electronic device may be a bendable or flexible electronic device. An electromagnetic wave adjusting device is configured as the electronic device to illustrate the disclosure in the following embodiments, but the disclosure is not limited thereto.

Figure 1B:
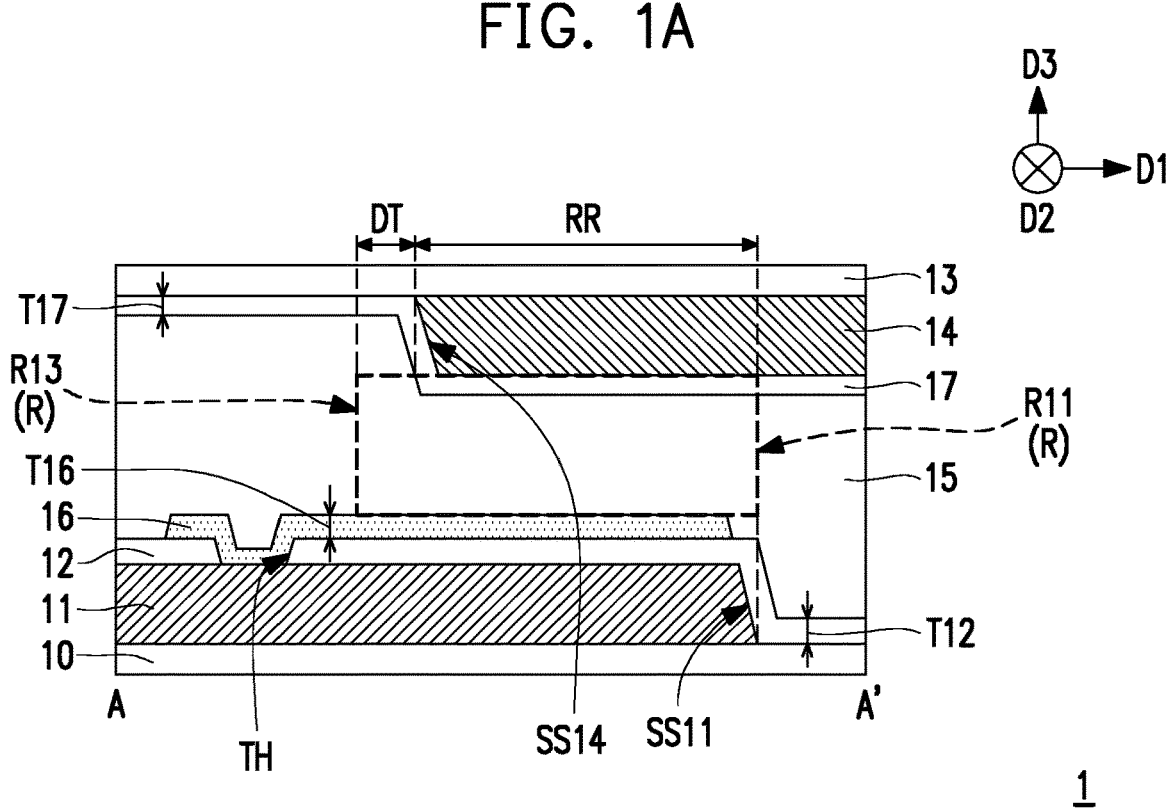
FIG. 1B is a schematic cross-sectional view of the section A-A' in FIG. 1A.
Figure 2:
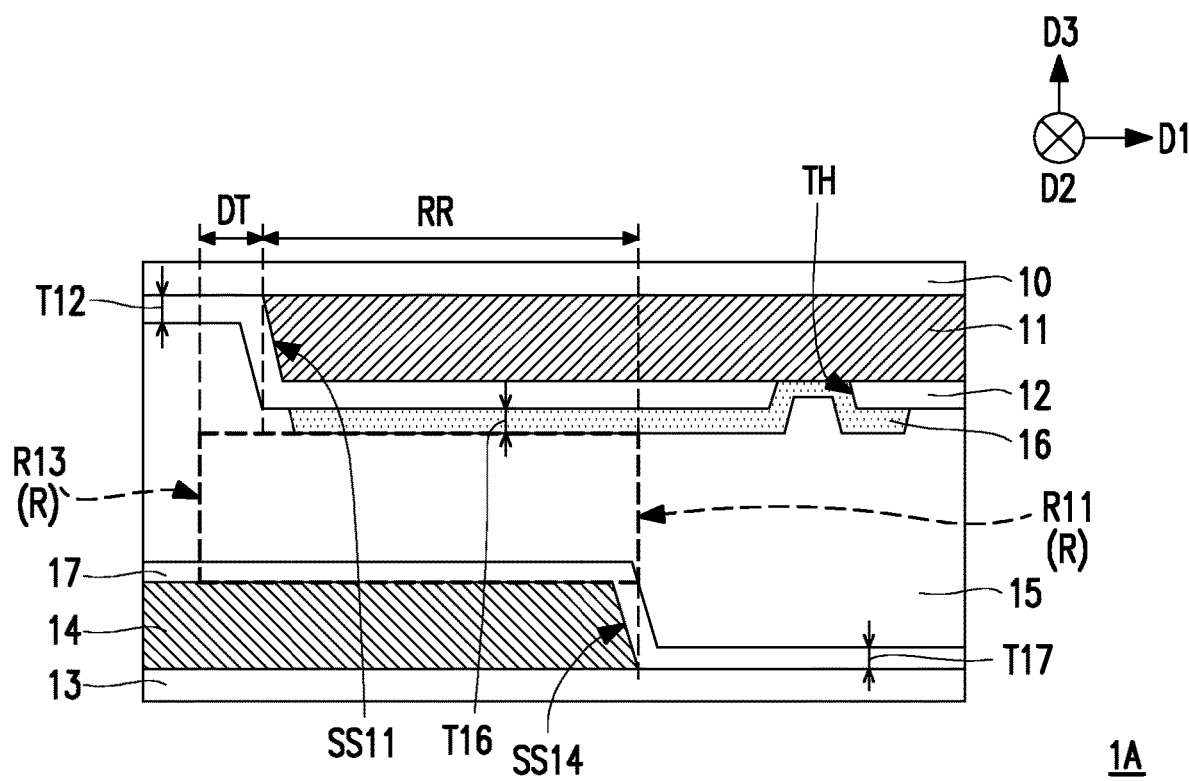
FIG. 2 and FIG. 3 are schematic cross-sectional views showing parts of other electromagnetic wave adjusting devices according to the first embodiment of the disclosure.
Figure 3:
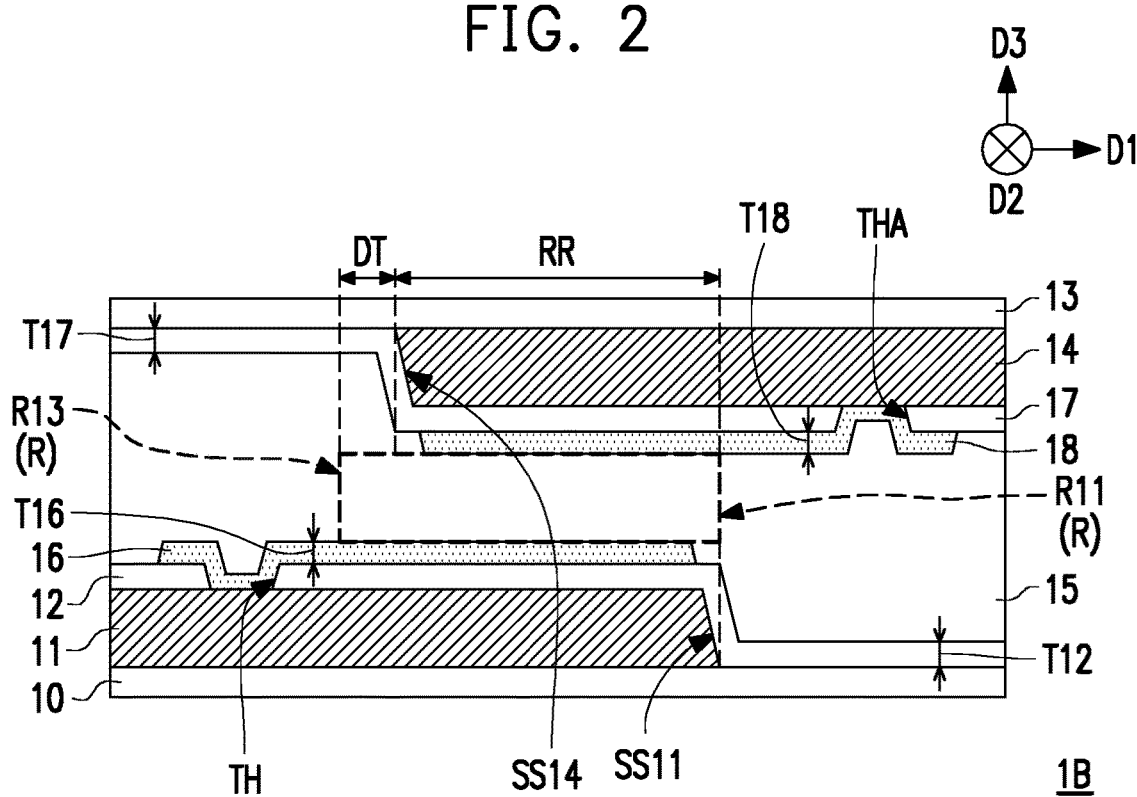
Figure 4A:
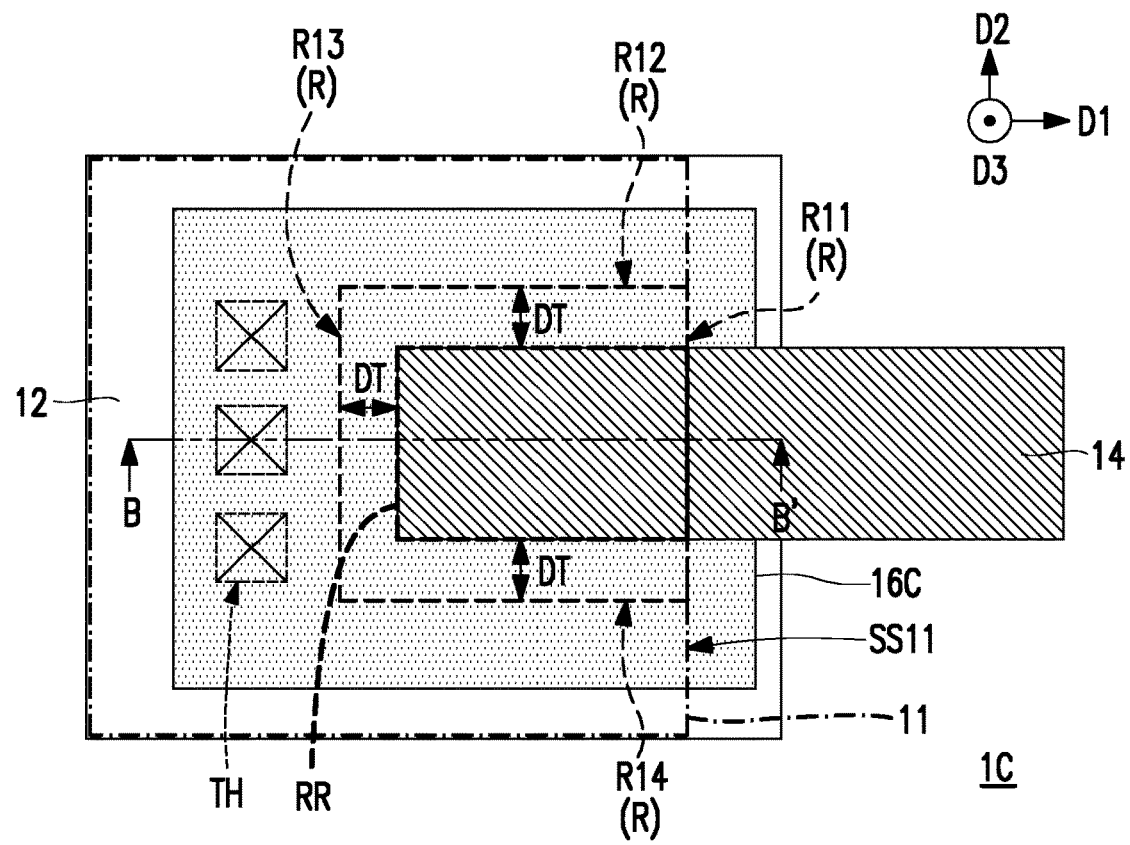
FIG. 4A is a schematic top view showing a part of an electromagnetic wave adjusting device according to the second embodiment of the disclosure.
Figure 4B:
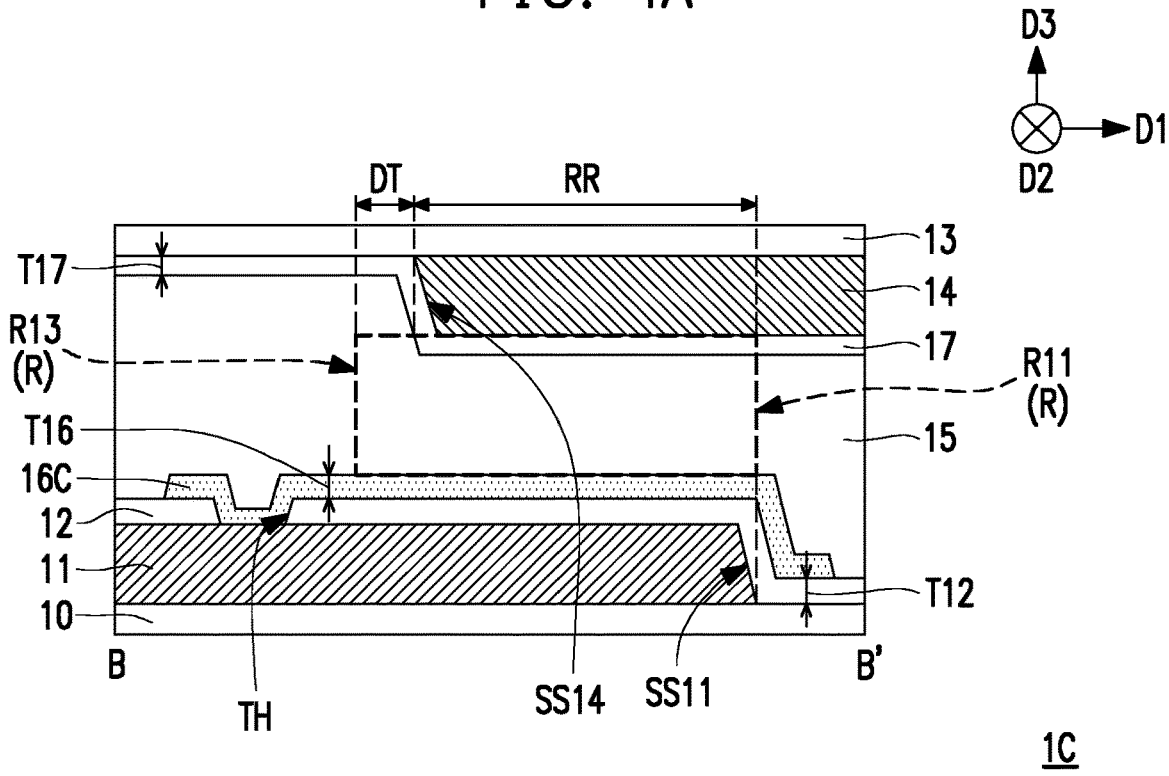
FIG. 4B is a schematic cross-sectional view of the section B-B' in FIG. 4A.
Figure 5A:
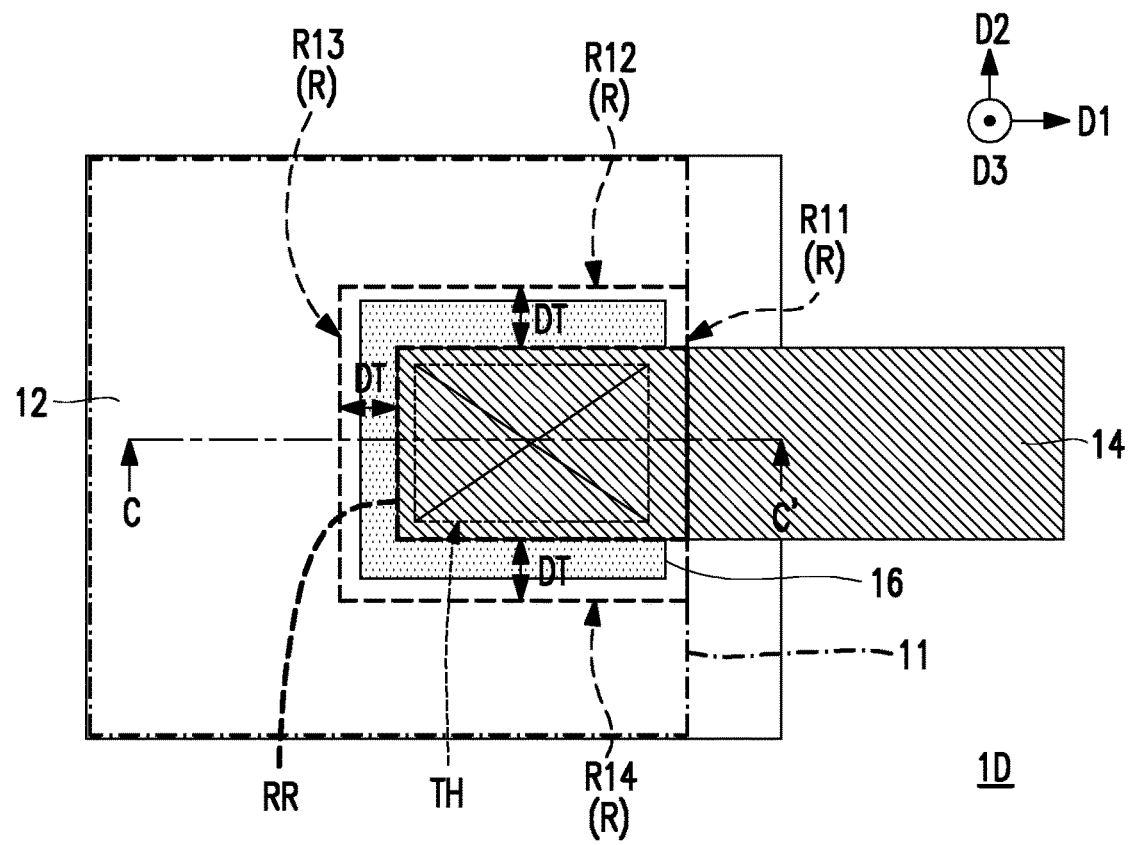
FIG. 5A is a schematic top view showing a part of an electromagnetic wave adjusting device according to the third embodiment of the disclosure.
Figure 5B:
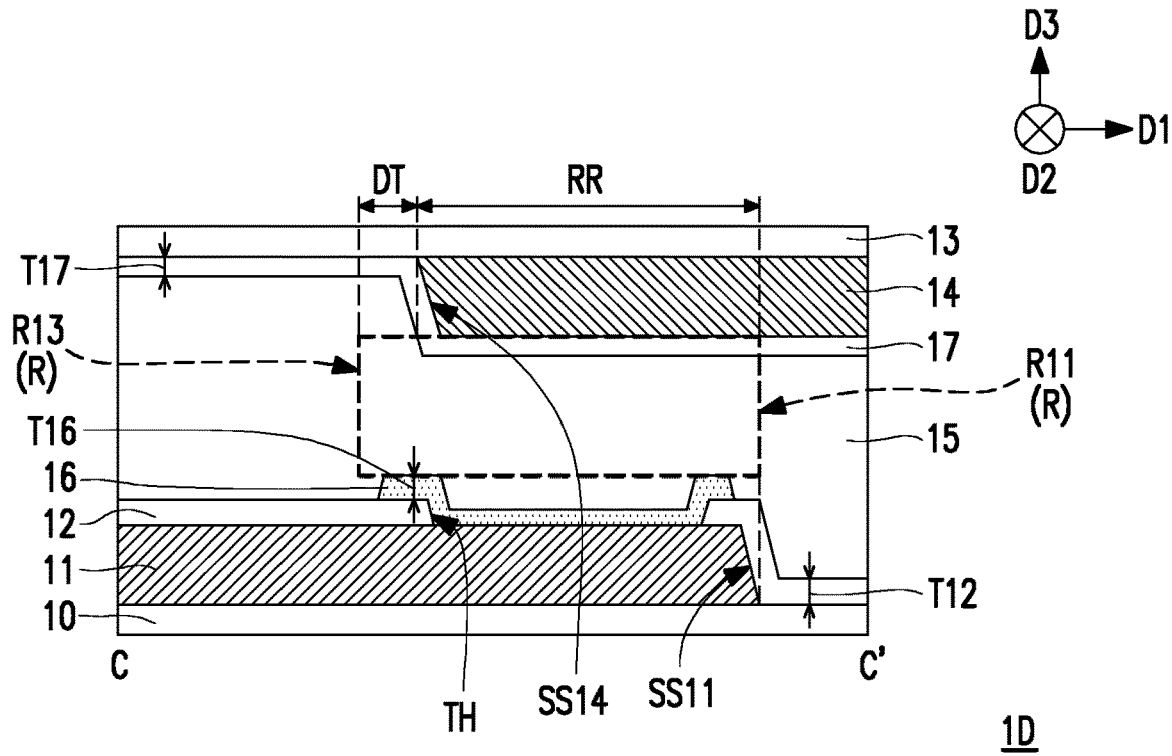
FIG. 5B is a schematic cross-sectional view of the section C-C' in FIG. 5A.
Figure 6A:
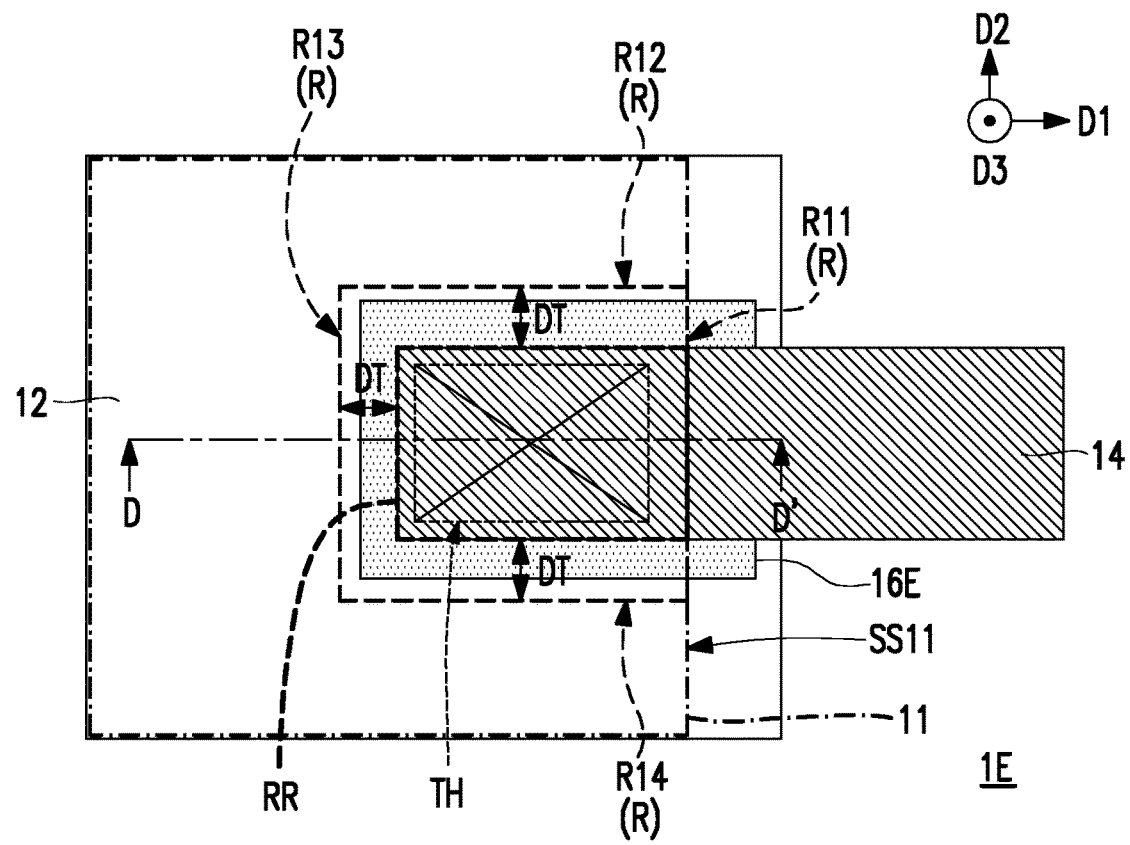
FIG. 6A is a schematic top view showing a part of an electromagnetic wave adjusting device according to the fourth embodiment of the disclosure.
Figure 6B:
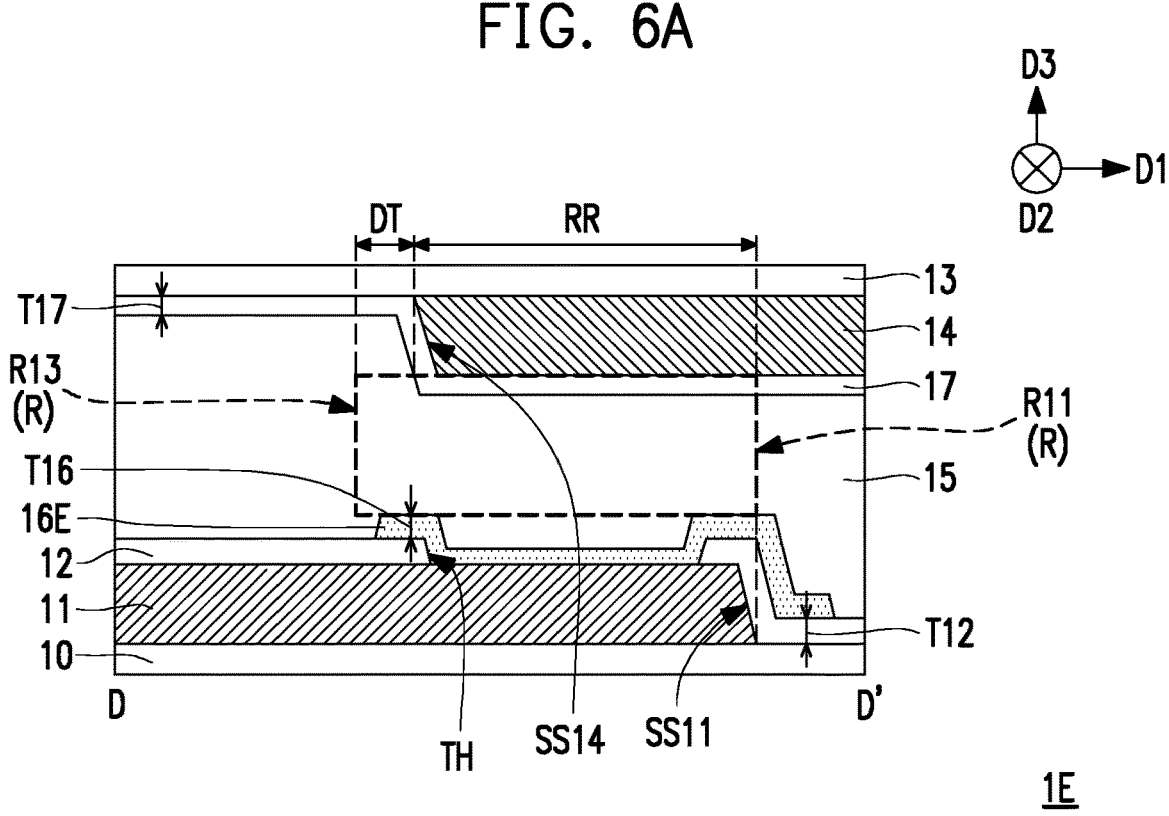
FIG. 6B is a schematic cross-sectional view of the section D-D' in FIG. 6A.

FIG. 1A is a schematic top view showing a part of an electromagnetic wave adjusting device according to the first embodiment of the disclosure. FIG. 1B is a schematic cross-sectional view of the section A-A' in FIG. 1A. FIG. 2 and FIG. 3 are schematic cross-sectional views showing parts of other electromagnetic wave adjusting devices according to the first embodiment of the disclosure. FIG. 4A is a schematic top view showing a part of an electromagnetic wave adjusting device according to the second embodiment of the disclosure. FIG. 4B is a schematic cross-sectional view of the section B-B' in FIG. 4A. FIG. 5A is a schematic top view showing a part of an electromagnetic wave adjusting device according to the third embodiment of the disclosure. FIG. 5B is a schematic cross-sectional view of the section C-C' in FIG. 5A. FIG. 6A is a schematic top view showing a part of an electromagnetic wave adjusting device according to the fourth embodiment of the disclosure. FIG. 6B is a schematic cross-sectional view of the section D-D' in FIG. 6A.

In the drawings, in order to clearly show the relative arrangement of the elements, each schematic top view showing a part of the electromagnetic wave adjusting device schematically illustrates one electromagnetic wave adjustment unit, and some elements in the electromagnetic wave adjustment unit are not shown in each schematic top view showing a part of the electromagnetic wave adjusting device. It should be understood that the electromagnetic wave adjusting device may include a plurality of electromagnetic wave adjusting units, and the plurality of electromagnetic wave adjusting units may be arranged in an array along a first direction D1 and a second direction D2, but the disclosure is not limited thereto. The first direction D1 and the second direction D2 are perpendicular to a normal direction D3 of the electromagnetic wave adjusting device, and the first direction D1 and the second direction D2 intersect each other, for example, perpendicular to each other, but the disclosure is not limited thereto. The shape, the quantity, or the arrangement of the electromagnetic wave adjusting unit in the electromagnetic wave adjusting device may be changed according to requirements, so details are not iterated.

Referring to FIG. 1A and FIG. 1B, an electromagnetic wave adjusting device 1 may include a first substrate 10, a first conductive element 11, a first insulation layer 12, a second substrate 13, a second conductive element 14, a dielectric layer 15, and a first conductive layer 16.

The first substrate 10 is configured to carry elements or film layers. For example, the material of the first substrate 10 may include plastic or glass, but the disclosure is not limited thereto.

The first conductive element 11 is disposed on the first substrate 10. The first conductive element 11 may be a single conductive layer or a stacked layer of multiple conductive layers. For example, the material of the first conductive element 11 may include a metal, an alloy, or a combination thereof, but the disclosure is not limited thereto.

The first insulation layer 12 is disposed on the first conductive element 11. The first insulation layer 12 may be a single insulation layer or a stacked layer of multiple insulation layers. For example, the material of the first insulation layer 12 may include organic insulating materials, inorganic insulating materials, or a combination thereof, but the disclosure is not limited thereto. In some embodiments, protection for the first conductive element 11 may be improved or corrosion of the first conductive element 11 may be prevented by increasing a thickness T12 of the first insulation layer 12. For example, the thickness T12 of the first insulation layer 12 may range from 0.1 µm to 50 µm (i.e., 0.1 µm≤T12≤50 µm). According to some embodiments, the thickness T12 of the first insulation layer 12 may range from 30 µm to 50 µm. According to some embodiments, the thickness T12 of the first insulation layer 12 may range from 0.2 µm to 20 µm. For example, from 0.2 µm to 0.6 µm, for example, from 0.1 µm to 1 µm, or for example, from 0.1 µm to 0.6 µm, but the disclosure is not limited thereto.

The overlap portion of the first conductive element 11 and the second conductive element 14 constitutes an overlap area RR. According to different requirements, the arrangement of the first insulation layer 12 may be changed. For example, the first insulation layer 12 may further cover an edge SS11 of the first conductive element 11 in the overlap area RR and a portion of the first substrate 10 that is not covered by the first conductive element 11, but the disclosure is not limited thereto.

The second substrate 13 is disposed opposite to the first substrate 10. Specifically, the second substrate 13 overlaps the first substrate 10 in the normal direction D3 of the electromagnetic wave adjusting device 1. The second substrate 13 is configured to carry elements or film layers. For example, the material of the second substrate 13 may include plastic or glass, but the disclosure is not limited thereto.

The second conductive element 14 is disposed on the second substrate 13 and faces the first substrate 10. In other words, the second conductive element 14 is disposed between the second substrate 13 and the first substrate 10. The second conductive element 14 may be a single conductive layer or a stacked layer of multiple conductive layers. For example, the material of the second conductive element 14 may include a metal, an alloy, or a combination thereof, but the disclosure is not limited thereto.

The dielectric layer 15 is disposed between the first substrate 10 and the second substrate 13. An appropriate dielectric layer 15 is selected according to the application category of the electromagnetic wave adjusting device 1. For example, the dielectric layer 15 may include a liquid crystal layer, and the electromagnetic wave adjusting device 1 may serve as a liquid crystal antenna, but the disclosure is not limited thereto. The liquid crystal layer may include twisted nematic liquid crystals (TN LCs), vertical alignment liquid crystals (VA LCs), in-plane switching liquid crystals (IPS LCs), or the like.

The first conductive layer 16 is disposed on the first insulation layer 12 and electrically connected to the first conductive element 11. In some embodiments, the first conductive layer 16 may be electrically connected to the first conductive element 11 through at least one through hole TH penetrating the first insulation layer 12, but the disclosure is not limited thereto.

The first conductive layer 16 may be a single conductive layer or a stacked layer of multiple conductive layers. For example, the material of the first conductive layer 16 may include a transparent conductive material, a metal, an alloy, or a combination of at least two of the aforementioned materials. In some embodiments, the material of the first conductive layer 16 may include an anti-oxidation metal material, such as indium tin oxide (ITO), indium zinc oxide (IZO), other types of metal oxides, or a combination of at least two of the aforementioned materials, to protect the first conductive element 11 or prevent corrosion of the first conductive element 11. In some embodiments, a thickness T16 of the first conductive layer 16 may range from 0.01 μm to 1 μm (i.e., $0.01\ \mu m \leq T16 \leq 1\ \mu m$) to have good conductivity or provide proper protection for the first conductive element 11. In some embodiments, the thickness T16 of the first conductive layer 16, for example, ranges from 0.03 μm to 0.5 μm, but the disclosure is not limited thereto.

The electromagnetic wave adjusting device 1 includes the overlap area RR and a capacitance adjustable area R. The capacitance adjustable area R includes an area where the dielectric layer 15 is affected by the fringe field effect. In some embodiments, the capacitance adjustable area R includes the overlap area RR. In some embodiments, the capacitance adjustable area R may be greater than the overlap area RR. As shown in FIG. 1A, the edge of the overlap area RR is used as a reference. Except that the edge (e.g., an edge R11) overlapping the second conductive element 14 is not pushed out, the remaining edges (e.g., an edge R12, an edge R13, and an edge R14) are pushed out a distance DT along directions parallel to the substrate to become the boundary of the capacitance adjustable area R. In this way, from the top view, the range of the capacitance adjustable area R includes the overlap area RR and the range obtained by pushing out the distance DT, as shown in FIG. 1A. On the other hand, in the disclosure, the distance DT refers to the shortest distance between an edge of the capacitance adjustable area R and an edge of the second conductive element 14 corresponding to the edge of the capacitance adjustable area R. In some embodiments, the distance DT may range from 1 μm to 1000 μm. For example, the distance DT may range from 1 μm to 100 μm, but the disclosure is not limited thereto. In some embodiments, from the top view of the electromagnetic wave adjusting device 1, the shape of the capacitance adjustable area R may correspond to the shape of the overlap area RR. Taking FIG. 1A as an example, the shape of the overlap area RR and the shape of the capacitance adjustable area R may be both quadrilateral, and an edge of the capacitance adjustable area R and an edge of the second conductive element 14 corresponding to the edge of the capacitance adjustable area R are separated by the distance DT. According to different requirements, the shape of the overlap area RR may also be circular, oval or of other shapes, and the shape of the capacitance adjustable area R may be changed accordingly. As mentioned above, the capacitance adjustable area R is formed by respectively pushing out the distance DT from each edge of the overlap area RR. The pushed-out distance DT can be same or different according to different edges of the overlap area RR.

At least part of the first conductive layer 16 is disposed in the capacitance adjustable area R to control the dielectric layer 15 (e.g., a liquid crystal layer) in the capacitance adjustable area R. By disposing the first conductive layer 16 electrically connected to the first conductive element 11 on the first insulation layer 12 in the capacitance adjustable area R, the distance between the conductive layers on two sides of the dielectric layer 15 in the normal direction D3 of the electromagnetic adjusting device 1 can be reduced, and thereby the capacitance adjustment range of the capacitance adjustable area is further improved or enhanced.

In some embodiments, the at least one through hole TH may not be disposed in the capacitance adjustable area R. In other words, the at least one through hole TH may not overlap the capacitance adjustable area R in the normal direction D3 of the electromagnetic wave adjusting device 1. Specifically, the at least one through hole TH may be disposed outside the capacitance adjustable area R, and the first conductive layer 16 may extend beyond the capacitance adjustable area R and is electrically connected to the first conductive element 11 through the at least one through hole TH, but the disclosure is not limited thereto. By disposing the at least one through hole TH outside the capacitance adjustable area R, the capacitance in the capacitance adjustable area R is prevented from being affected by the at least one through hole TH. FIG. 1A schematically illustrates that three through holes TH are arranged along the second direction D2 on one side of the capacitance adjustable area R. However, the quantity, arrangement, and top view shape of the through hole TH, or the relative arrangement between the through hole TH and the capacitance adjustable area R may be changed according to requirements. For example, multiple through holes TH may be disposed on adjacent two sides, opposite two sides, three sides, four sides, at least one corner, or a combination thereof of the capacitance adjustable area R, but the disclosure is not limited thereto.

According to different requirements, the electromagnetic wave adjusting device 1 may further include other elements or film layers. For example, the electromagnetic wave adjusting device 1 may further include a second insulation layer 17. The second insulation layer 17 is disposed on the second conductive element 14 and disposed between the second conductive element 14 and the dielectric layer 15. The second insulation layer 17 may be a single insulation layer or a stacked layer of multiple insulation layers. For example, the material of the second insulation layer 17 may include organic insulating materials, inorganic insulating materials, or a combination thereof, but the disclosure is not limited thereto. In some embodiments, protection for the second conductive element 14 or corrosion of the second conductive element 14 can be improved or prevented by increasing a thickness T17 of the second insulation layer 17. For example, the thickness T17 of the second insulation layer 17 may range from 0.1 μm to 50 μm (i.e., 0.1 μm≤T12≤50 μm). According to some embodiments, the thickness T17 of the second insulation layer 17 may range from 30 μm to 50 μm. According to some embodiments, the thickness T17 of the second insulation layer 17 may range from 0.2 μm to 20 μm. For example, from 0.2 μm to 0.6 μm, for example, from 0.1 μm to 1 μm, or for example, from 0.1 μm to 0.6 μm, but the disclosure is not limited thereto.

According to different requirements, the arrangement of the second insulation layer 17 may be changed. For example, the second insulation layer 17 may further cover an edge SS14 of the second conductive element 14 in the overlap area RR and a portion of the second substrate 13 that is not covered by the second conductive element 14, but the disclosure is not limited thereto.

Referring to FIG. 2, the main differences between the electromagnetic wave adjusting device 1A and the electromagnetic wave adjusting device 1 in FIG. 1A and FIG. 1B are as follows. In the electromagnetic wave adjusting device 1 in FIG. 1A and FIG. 1B, the first substrate 10 is a lower substrate, the second substrate 13 is an upper substrate, and the first conductive layer 16 is disposed between the dielectric layer 15 and the lower substrate. On the other hand, in the electromagnetic wave adjusting device 1A of FIG. 2, the first substrate 10 is an upper substrate, the second substrate 13 is a lower substrate, and the first conductive layer 16 is disposed between the dielectric layer 15 and the upper substrate. In other words, in the embodiment of the disclosure, the conductive layer (e.g., the first conductive layer 16) may be disposed on the insulation layer on the upper substrate and electrically connected to the conductive element on the upper substrate (as shown in FIG. 2), or may be disposed on the insulation layer on the lower substrate and electrically connected to the conductive element on the lower substrate (as shown in FIG. 1B).

Referring to FIG. 3, the main differences between the electromagnetic wave adjusting device 1B and the electromagnetic wave adjusting device 1 in FIG. 1A and FIG. 1B are as follows. The electromagnetic wave adjusting device 1B further includes a second conductive layer 18. The second conductive layer 18 is disposed on the second insulation layer 17 and electrically connected to the second conductive element 14. For example, the second conductive layer 18 may be electrically connected to the second conductive element 14 through at least one through hole THA penetrating the second insulation layer 17. The quantity, arrangement, or top view shape of the through hole THA may be changed according to requirements, and it is not limited thereto. In other words, in the embodiment of the disclosure, the conductive layers (e.g., the first conductive layer 16 and the second conductive layer 18) may be disposed on the insulation layers disposed on the lower and upper substrates respectively, and the conductive layers disposed on the lower and upper substrates are electrically connected to the conductive elements (e.g., the first conductive element 11 and the second conductive element 14) on the lower and upper substrates, respectively.

The second conductive layer 18 may be a single conductive layer or a stacked layer of multiple conductive layers. For example, the material of the second conductive layer 18 may include a transparent conductive material, a metal, an alloy, or a combination of at least two of the aforementioned material. In some embodiments, the material of the second conductive layer 18 may include an anti-oxidation metal material, such as indium tin oxide (ITO), indium zinc oxide (IZO), other types of metal oxides, or a combination of at least two of the aforementioned material to protect the second conductive element 14 or prevent corrosion of the second conductive element 14. In some embodiments, a thickness T18 of the second conductive layer 18 may range from 0.01 μm to 1 μm to have good conductivity or provide proper protection for the second conductive element 14. In some embodiments, the thickness T18 of the second conductive layer 18, for example, ranges from 0.03 μm to 0.5 μm, but the disclosure is not limited thereto.

At least part of the second conductive layer 18 is disposed in the capacitance adjustable area R to control the dielectric layer 15 (e.g., a liquid crystal layer) in the capacitance adjustable area R. By disposing the second conductive layer 18 electrically connected to the second conductive element 14 on the second insulation layer 17 in the capacitance adjustable area R, the distance between the conductive layers on two sides of the dielectric layer 15 in the normal direction D3 of the electromagnetic adjusting device 1 can be reduced, and thereby the capacitance adjustment range of the capacitance adjustable area is further improved.

In some embodiments, the at least one through hole THA may not be disposed in the capacitance adjustable area R. In other words, the at least one through hole THA may not overlap the capacitance adjustable area R in the normal direction D3 of the electromagnetic wave adjusting device 1B. Specifically, the at least one through hole THA may be disposed outside the capacitance adjustable area R, and the second conductive layer 18 may extend beyond the capacitance adjustable area R and is electrically connected to the second conductive element 14 through the at least one through hole THA, but the disclosure is not limited thereto. By disposing the at least one through hole THA outside the capacitance adjustable area R, the capacitance in the capacitance adjustable area R is prevented from being affected by the at least one through hole THA.

Referring to FIG. 4A and FIG. 4B, the main differences between the electromagnetic wave adjusting device 1C and the electromagnetic wave adjusting device 1 in FIG. 1A and FIG. 1B are as follows. In the electromagnetic wave adjusting device 1C, the first conductive layer 16C extends beyond the first conductive element 11 and overlaps the edge SS11 of the first conductive element 11. Taking FIG. 4B as an example, the first conductive layer 16C may extend, from above the first conductive element 11, along the first direction D1, and beyond the edge SS11 of the first conductive element 11. In some embodiments, the first conductive layer 16C may further extend to a portion of the first insulation layer 12 that does not overlap the first conductive element 11 in the normal direction D3. Note that the above improvements can be applied to any embodiment of the disclosure. For example, in the embodiment of FIG. 2, the first conductive layer 16 may also extend beyond the edge SS11 of the first conductive element 11 in the overlap area RR. In the embodiment of FIG. 3, the first conductive layer 16 may also extend beyond the edge SS11 of the first conductive element 11 in the overlap area RR, and/or the second conductive layer 18 may also extend beyond the edge SS14 of the second conductive element 14 in the overlap area.

Referring to FIG. 5A and FIG. 5B, the main differences between the electromagnetic wave adjusting device 1D and the electromagnetic wave adjusting device 1 in FIG. 1A and FIG. 1B are as follows. In the electromagnetic wave adjusting device 1D, the at least one through hole TH in the first insulation layer 12 is disposed in the capacitance adjustable area R. In other words, the at least one through hole TH overlaps the capacitance adjustable area R in the normal direction D3 of the electromagnetic wave adjusting device 1D. FIG. 5A schematically illustrates that the first insulation layer 12 has a through hole TH, but the quantity, top view shape, and arrangement of the through hole TH in the first insulation layer 12, or the relative arrangement between the through hole TH and the capacitance adjustable area R may be changed according to requirements. In some embodiments, from the top view of the electromagnetic wave adjusting device 1D, as shown in FIG. 5A, the maximum orthographic projection area of the first conductive layer 16 on the first conductive element 11 may be less than or equal to the area of the capacitance adjustable area R; alternatively, the maximum orthographic projection area of the first conductive layer 16 on the first conductive element 11 may be greater than the area of the capacitance adjustable area R. For example, the first conductive layer 16 may extend beyond the edge R11 or edge R13 of the capacitance adjustable area R in the first direction D1, or the first conductive layer 16 may extend beyond the edge R12 or edge R14 of the capacitance adjustable area R in the second direction D2. Note that the above improvements can be applied to any embodiment of the disclosure. For example, in the embodiment of FIG. 2, the at least one through hole TH in the first insulation layer 12 may be disposed in the capacitance adjustable area R. In the embodiment of FIG. 3, the at least one through hole TH in the first insulation layer 12 may be disposed in the capacitance adjustable area R, and/or the at least one through hole THA in the second insulation layer 17 may be disposed in the capacitance adjustable area R.

Referring to FIG. 6A and FIG. 6B, the main differences between the electromagnetic wave adjusting device 1E and the electromagnetic wave adjusting device 1 in FIG. 1A and FIG. 1B are as follows. In the electromagnetic wave adjusting device 1E, the at least one through hole TH in the first insulation layer 12 is disposed in the capacitance adjustable area R, and the first conductive layer 16E extends beyond the edge SS11 of the first conductive element 11 in the overlap area RR. Note that the above improvements can be applied to any embodiment of the disclosure. For example, in the embodiment of FIG. 2, the at least one through hole TH in the first insulation layer 12 may be disposed in the capacitance adjustable area R, and the first conductive layer 16 may extends beyond the edge SS11 of the first conductive element 11 in the overlap area RR. In the embodiment of FIG. 3, the at least one through hole TH in the first insulation layer 12 may be disposed in the capacitance adjustable area R, and the first conductive layer 16 may extend beyond the edge SS11 of the first conductive element 11 in the overlap area RR; and/or the at least one through hole THA in the second insulation layer 17 may be disposed in the capacitance adjustable area R, and the second conductive layer 16 may also extend beyond the edge SS14 of the second conductive element 14 in the overlap area.

Based on the above, in the embodiments of the disclosure, by disposing the first conductive layer to be electrically connected to the first conductive element on the first insulation layer in the capacitance adjustable area, the capacitance adjustment range of the capacitance adjustable area can be increased or enhanced. In some embodiments, by disposing the at least one through hole of the first insulation layer outside the capacitance adjustable area, the capacitance in the capacitance adjustable area is prevented from being affected by the at least one through hole.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

Although the disclosure has been described with reference to the above embodiments, it will be apparent to one of ordinary skill in the art that modifications, replacements, and changes to the described embodiments may be made without departing from the spirit and the scope of the disclosure. In addition, the features of multiple embodiments may be replaced, recombined, or mixed to form other embodiments. In addition, the protection scope of the disclosure is not limited to the process, machine, manufacturing, material composition, device, method, and step in specific embodiments described in the specification. Persons skilled in the art may understand the current or to-be-developed process, machine, manufacturing, material composition, device, method, and step from the content of the disclosure, which may be used according to the disclosure as long as the substantially same functions or substantially same results as in the embodiments described herein can be obtained. Therefore, the protection scope of the disclosure includes the foregoing process, machine, manufacturing, material composition, device, method, and step. In addition, each claim constitutes an individual embodiment, and the protection scope of the disclosure also includes a combination of the claims and embodiments. The protection scope of the disclosure should be determined based on the scope defined in the appended claims.

What is claimed is:

1. An electromagnetic wave adjusting device, comprising:
   a first substrate;
   a first conductive element disposed on the first substrate;
   a first insulation layer disposed on the first conductive element;
   a second substrate disposed opposite to the first substrate;
   a second conductive element disposed on the second substrate and facing the first substrate;
   a dielectric layer disposed between the first substrate and the second substrate; and
   a first conductive layer disposed on the first insulation layer and electrically connected to the first conductive element, wherein the electromagnetic wave adjusting device comprises an overlap area and a capacitance adjustable area, an overlap portion of the first conductive element and the second conductive element constitutes the overlap area, the capacitance adjustable area comprises the overlap area, and at least part of the first conductive layer is disposed in the capacitance adjustable area.

2. The electromagnetic wave adjusting device according to claim 1, wherein the capacitance adjustable area is greater than the overlap area.

3. The electromagnetic wave adjusting device according to claim 1, wherein the first conductive layer is electrically connected to the first conductive element through at least one through hole penetrating the first insulation layer.

4. The electromagnetic wave adjusting device according to claim 3, wherein the at least one through hole is not disposed in the capacitance adjustable area.

5. The electromagnetic wave adjusting device according to claim 3, wherein the at least one through hole is disposed in the capacitance adjustable area.

6. The electromagnetic wave adjusting device according to claim 1, wherein the first conductive layer extends beyond an edge of the first conductive element in the overlap area.

7. The electromagnetic wave adjusting device according to claim 1, wherein a thickness of the first conductive layer ranges from 0.01 µm to 1 µm.

8. The electromagnetic wave adjusting device according to claim 1, wherein a thickness of the first insulation layer ranges from 0.1 µm to 50 µm.

9. The electromagnetic wave adjusting device according to claim 1, further comprising:
 a second insulation layer disposed on the second conductive element; and
 a second conductive layer disposed on the second insulation layer and electrically connected to the second conductive element, wherein at least part of the second conductive layer is disposed in the capacitance adjustable area.

10. The electromagnetic wave adjusting device according to claim 9, wherein the second conductive layer is electrically connected to the second conductive element through at least one through hole penetrating the second insulation layer.

* * * * *